United States Patent [19]

Pompe

[11] Patent Number: 4,779,300
[45] Date of Patent: Oct. 25, 1988

[54] CONTACT LENS CLEANING DEVICE

[76] Inventor: Larry W. Pompe, 115½ E. Litchfield Ave., Willmar, Minn. 56201

[21] Appl. No.: 22,813

[22] Filed: Mar. 9, 1987

[51] Int. Cl.⁴ .......................... B08B 1/00; D05C 1/04
[52] U.S. Cl. .................... 15/104.93; 15/214; 15/244.1; 15/244.3; 38/102.2
[58] Field of Search .............. 15/214, 104.92, 104.93, 15/104.94, 218, 218.1, 244.1, 244.2, 244.3, 209 R, 210 R; 38/102.2

[56] References Cited

U.S. PATENT DOCUMENTS

| | | | |
|---|---|---|---|
| 928,598 | 7/1909 | Gibbs | 38/102.2 |
| 1,244,892 | 10/1917 | Preyer | 38/102.2 |
| 2,079,600 | 1/1937 | Brooks . | |
| 2,121,701 | 8/1938 | Landers . | |
| 2,703,424 | 3/1955 | Nicoli | 15/244.1 |
| 2,867,954 | 1/1959 | Phillips . | |
| 2,885,703 | 5/1959 | Elliot | 15/118 |
| 3,148,404 | 4/1964 | Jensen . | |
| 4,434,520 | 7/1964 | Caniglia . | |

FOREIGN PATENT DOCUMENTS

| | | | |
|---|---|---|---|
| 494149 | 10/1938 | United Kingdom | 15/244.3 |
| 806980 | 1/1959 | United Kingdom | 15/214 |

OTHER PUBLICATIONS

The Boston Lens Cleaning Polish and Manual Polishing Machine instruction sheet (1982).

*Primary Examiner*—Peter Feldman
*Attorney, Agent, or Firm*—Burd, Bartz & Gutenkauf

[57] ABSTRACT

An appliance for cleaning hard or soft contact lenses, as well as other delicate optical objects. A frame carrying a cleaning pad or cloth is mounted in a base. The frame has an access opening that is covered by the pad. The pad overlaps the edges of the frame defining the access opening. The base has a mounting opening corresponding in size and shape to the shape of the frame such that the frame can be installed in the opening of the base with the edges of the pad lodged between the frame and the base and the portion of the pad covering the access opening exposed and accessible by the user. Cleaning solution is applied to the accessible portion of the pad and the contact lens rubbed upon it in order to clean the lens.

12 Claims, 1 Drawing Sheet

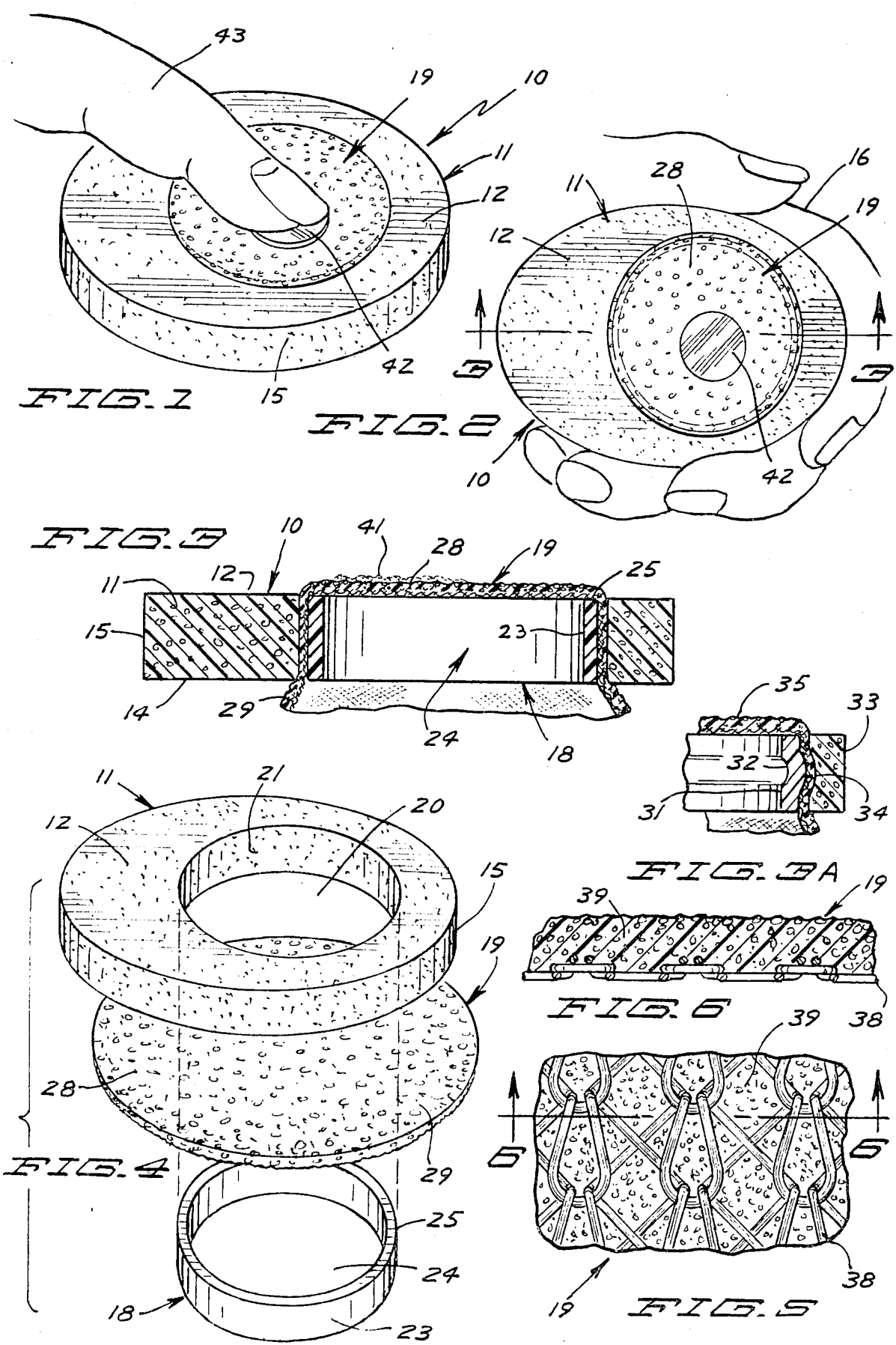
U.S. Patent    Oct. 25, 1988    4,779,300

CONTACT LENS CLEANING DEVICE

BACKGROUND OF THE INVENTION

A leading cause of contact lens discomfort and shortened wearing time is the failure of the wearer to keep lenses free of surface deposits and coatings. These hard-to-clean coatings on lenses are due to tear film mucus and protien, cosmetic, smog and air pollution and many other substances that are present in our daily lives. Failure to clean off these deposits can result in lens dryness, blurriness or other eye irritations.

Contact lens cleaning solutions for both soft and rigid lenses rely primarily upon the user rubbing or scrubbing their lenses against the skin of the palm of the hand or fingers. This is a hazardous and inefficient cleaning method as best and often results in scratched, nicked or torn lenses. Skin roughness and minute particles imbedded in the skin can easily scratch or damage a lens and the natural oiliness of the skin can even add to lens surface build-up.

SUMMARY OF THE INVENTION

The invention pertains to a cleaning device primarily for the cleaning of contact lenses of both the hard and soft variety. The device includes a base or outer member having a mounting opening. A frame has an outer peripheral side wall of a shape to snugly fit within the mounting opening of the base. The frame also has an access opening. The access opening is covered by a cleaning pad or cloth. The central portion of the cleaning pad or cloth is stretched taut across the access opening of the frame, while edges of the cleaning cloth overlap the frame side wall and are frictionally engaged between the side wall of the frame and the surface walls of the base defining the mounting opening. Contact lens cleaning solution is applied to the central portion of the cleaning pad. The wearer rubs the contact lens against the pad on the cleaning solution, first one side and then the other. The lens is then rinsed and sterilized in the usual fashion. The contact lens cleaning pad is also rinsed. For convenience it can be removed fom the base and frame for the rinsing procedure. A used and worn cleaning pad is readily replaced. The base is optimally shaped as like an oval to comfortably fit in the palm of the hand. The base can be of a resilient material for snug receipt of the frame covered by the cleaning pad.

IN THE DRAWINGS:

FIG. 1 is a view in perspective of the contact lens cleaning device of the invention shown in use during a lens cleaning procedure;

FIG. 2 is a top plan view of the lens cleaning device of FIG. 1 held in the palm of a hand;

FIG. 3 is an enlarged sectional view of the contact lens cleaning device of FIG. 2 taken along the line 3—3 thereof;

FIG. 3A is an enlarged sectional view of a portion of the contact lens cleaning device of FIG. 3 but showing a modification thereof;

FIG. 4 is an assembly view of the contact lens cleaning device of FIG. 1;

FIG. 5 is an enlarged fragmentary bottom view of a portion of the cleaning pad of the contact lens cleaning device of the invention; and FIG. 6 is a sectional view of a portion of the cleaning pad of FIG. 5 taken along the line 6—6 thereof.

DESCRIPTION OF A PREFERRED EMBODIMENT

Referring to the drawings, there is shown in FIGS. 1 through 4 a contact lens cleaning device indicated generally at 10 useful in cleaning contact lens of both the hard and soft variety as well as other small and delicate items. Contact lens cleaning device 10 includes an outer member comprised as a base or holder 11 having a flat front face or surface 12 and a flat rear face or surface 14. Face 11 has a curved side wall 15 with an oval shape so as to fit optimally in the palm of a hand 16 as shown in FIG. 2.

Contact lens cleaner 10 also includes an inner member comprised as a frame or retaining ring 18 and a cleaning pad 19. Base 11 has a mounting or retaining opening 20 (see FIG. 4) defined by interior side wall 21 preferably circular in shape. Ring 18 is formed as a cylindrical segment having a cylindrical side wall 23 defining an access opening 24. Side wall 23 is shaped corresponding to mounting opening 20 of base 11. In the version of the cleaning device shown, side wall 23 is slightly smaller in peripheral dimension for a friction fit in mounting opening 20. Side wall 23 has a height corresponding to the thickness or width of base 11.

Cleaning pad 19 is circular in shape having a central portion 28 and a peripheral edge or skirt portion 29. The cleaning pad 19 is installed on ring 18 with the central portion 28 in spanning relationship to and relatively taut over the access opening 24. The edge or skirt 29 overlaps the upper edge 25 of side wall 23 or ring 18. As shown in FIG. 3, with the cleaning pad 19 so positioned with respect to the ring 18, both are installed in the mounting opening 20 of base 11. In the form shown in FIG. 3, base 11 is comprised of a somewhat resilient expanded foam material and ring 18 can be made of plastic. When installed in the mounting opening 20, the ring slightly expands the mounting opening. The skirt of cleaning pad 19 is wedged between the outer sidewall 23 of the ring 18 and the interior side wall 21 of the mounting opening 20. The holder or base 11 resiliently embraces the frame 18 and pad 19. The outer or cleaning surface 28 of the pad 19 is substantially coplanar or coextensive with the front surface 12 of base 11.

The ring 18 along with a cleaning pad 19 is readily insertable and removable from the mounting opening 20 for purposes of cleaning and replacement. The ring 18 could be held to the holder 11 by other means. For example, in FIG. 3A there is shown an inner member 31 having a peripheral rib 32. An outer member 33 has a groove 34 corresponding in shape to the rib 32. The inner member 31 and outer member 33 are engaged in a snap-fit relationship with the rib 32 engaged in the groove 34 while the skirt of a cleaning pad 35 is engaged and held between them. Other means could be employed for assemblying the inner and outer members together with the skirt of the cleaning pad lodged between them.

Cleaning pad 19 is comprised of a soft sheet-like material. In the version shown, cleaning pad 19 is comprised of a fabric and a foam or sponge material. As shown in FIGS. 5 and 6, cleaning pad 19 includes a first fabric layer 38 such as a Tricot fabric. A second layer 39 of foam or sponge material is bonded or otherwise made to adhere to the first layer 38. Foam layer 39 can be an open cell Polyurethane foam heat bonded to fabric 38. The foam layer 39 is orientated facing outwardly with respect to the base 11 when the ring 18 is installed therein. The foam 19 is of a material adapted to readily receive a surfactant such as a contact lens cleaning solution, while the first layer 38 provides a stable and strong support for the foam layer 39. Both are porous so as to readily be cleaned and rinsed, and both are somewhat elastic so as to be stretched taut across ring 18.

Base 11 is generally oval to fit comfortably in the palm of the average hand. It can typically have a major dimension of approximately 2.5 inch (6.35 cm.), a minor dimension of approximately 1.5 inch (3.80 cm.), and a thickness of approximately 0.5 inch (1.26 cm.).

In the use of contact lens cleaning device 10, a cleaning pad 19 is installed on the ring 18 with the central portion 28 in spanning relationship to the access opening 24 of ring 18 and skirt or edges 29 overlapping side walls 23. The ring 18 is pushed into the mounting opening 20 with the foam 39 facing upward to a position as shown in FIG. 3 with the cleaning pad approximately coplanar with the top surface 12 of base 11. A small amount of cleaning solution 41 is applied to the top surface of the central portion 28 of the cleaning pad 19. A contact lens 42 is placed on a top surface and manipulated thereon by a finger 43 preferably using a back and forth motion. A lens holder other than a finger can be used. When one side of the contact lens 42 has been scrubbed, it is turned over and the other side is cleaned. The central portion 28 of the pad 19 can be supported from the back side by inserting a finger or other instrument through the opposite or rear portion of the mounting opening 20. Once the contact lens is scrubbed, it is rinsed and sterilized in the normal fashion. The pad 19 is also rinsed either in place in the base 11 or it is removed for cleaning and rinsing. When the pad is worn out it is simply replaced with a new one.

While there has been shown and described certain embodiments of the invention, it will apparent to those skilled in the art that certain deviations can be had without departing from scope and spirit of the invention.

The embodiments of the invention in which an exclusive property or privilege is claimed are defined as follows:

1. A contact lens cleaning device, comprising:
   a base;
   a generally circular frame having an outer peripheral uninterrupted annular side wall and an inner side wall defining an inner access opening;
   a flexible contact lens cleaning pad having a central portion for covering the access opening of the frame, and edge portions extending from the central portion for overlapping the peripheral side wall of the frame;
   said base having a shape that is generally curved to comfortably fit in the hand of a user and, a generally circular mounting opening and a planar upper and lower surface at least partially surrounding the mounting opening;
   said mounting opening in the base having a continuous uninterrupted interior side wal corresponding in size and shape to the outer peripheral side wall of the frame between the upper and lower planar surfaces and being slightly larger than the frame such that the frame and the cleaning pad covering the access opening and edges overlapping the side wall of the frame fit in the mounting opening of the base in a friction fit relationship;
   said cleaning pad being a laminate of foam type material and fabric type material;
   said frame being removably installed in the mounting opening of the base with the edge portion of the cleaning pad lodged between the peripheral side wall of the frame and the inner side wall of the mounting opening with the central portion of the pad spanning the access opening of the frame and the mounting opening of the base in coplanar relationship with the surface of the base and said foam type material being exposed for access for a contact lens cleaning procedure.

2. The contact lens cleaning device of claim 1 wherein: said base is oval in shape to comfortably fit in the hand of a user.

3. The contact lens cleaning device of claim 1 wherein: said frame is comprised of a cylindrical ring.

4. The contact lens cleaning device of claim 1 wherein: said base is a resilient expanded foam material.

5. The contact lens cleaning device of claim 2 wherein:
   said base is approximately between $2\frac{1}{2}$ and 3 inches in major dimension and $1\frac{1}{2}$ to 2 inches in minor dimension having a thickness of approximately $\frac{1}{2}$ inch.

6. The contact lens cleaning device of claim 5 including: a contact lens cleaning solution applied to the exposed surface of the cleaning pad.

7. The contact lens cleaning device of claim 3 wherein: the heighth or the ring and the width of the base are approximately equal.

8. A contact lens cleaning apparatus comprising:
   frame means having an outer curved uninterrupted side wall and an inner side wall defining a central access opening adjacent the side wall edges;
   a flexible cleaning pad having a central portion for spanning the access opening of the frame means and edges for disposition in overlapping relationship to the side wall edges, and a lens cleaning solution located on a surface of the cleaning pad facing away from the side wall edges;
   holding means having a continuous uninterrupted opening defined by a side wall corresponding in size and shape to the outer peripheral side wall of the frame means throughout the depth of the opening for engaging the side wall of the frame means with the cleaning pad edge lodged between the frame means side wall and the holding means to hold the cleaning pad in position with respect to the access opening of the frame means during a lens cleaning procedure;
   said holding means being comprised as a base having generally curved shaped planar top and bottom surfaces in adjacent relationship to the frame means and cleaning pad when installed in the holding means, said base having a rectangular cross-section, a major dimension of approximately between $2\frac{1}{2}$ and 3 inches, a minor dimension of approximately between $1\frac{1}{2}$ and 2 inches, and a thickness of approximately $\frac{1}{2}$ inch, so as to fit comfortably in the hand of the user with the cleaning pad surface outwardly facing such that the contact lens can be brought into surface engagement with it for a cleaning procedure.

9. The contact lens cleaning device of claim 8 wherein: said holding means is resilient.

10. The contact lens cleaning device of claim 8 wherein: said cleaning pad is a laminate of foam material and fabric material, said cleansing solution being located on the side of the laminate having the foam material.

11. The contact lens cleaning device of claim 10 wherein: said frame means is circular and said access opening is circular.

12. The contact lens cleaning device of claim 11 wherein: said holding means is a base having a circular mounting opening slightly larger than the diameter of the frame means so that the frame means is removably installed with the cleaning pad in the mounting opening in friction-fit relationship.

* * * * *